US008527588B2

(12) United States Patent
Beck et al.

(10) Patent No.: US 8,527,588 B2
(45) Date of Patent: Sep. 3, 2013

(54) WEB CONFERENCE PERFORMANCE MONITORING SYSTEM

(75) Inventors: Chao M. Beck, Austin, TX (US); Joey Allen Perry, Pflugerville, TX (US); Howard Neil Anglin, Austin, TX (US); Juan Francisco Obas, Austin, TX (US); Randal Alan Anders, Austin, TX (US); Reginald Ford Ratcliff, Jr., Hutto, TX (US)

(73) Assignee: International Business Machines Corporation, Armonk, NY (US)

( * ) Notice: Subject to any disclaimer, the term of this patent is extended or adjusted under 35 U.S.C. 154(b) by 383 days.

(21) Appl. No.: 12/464,220

(22) Filed: May 12, 2009

(65) Prior Publication Data
US 2010/0293226 A1 Nov. 18, 2010

(51) Int. Cl.
*G06F 15/16* (2006.01)
*G06F 15/177* (2006.01)
*G06F 15/173* (2006.01)

(52) U.S. Cl.
USPC .......... 709/204; 709/217; 709/220; 709/223; 709/227; 709/250

(58) Field of Classification Search
USPC ....................................................... 709/204
See application file for complete search history.

(56) References Cited

U.S. PATENT DOCUMENTS

| | | | | |
|---|---|---|---|---|
| 6,697,341 | B1* | 2/2004 | Roy | 370/260 |
| 6,901,582 | B1 | 5/2005 | Harrison | |
| 8,370,952 | B1* | 2/2013 | Wieder | 726/26 |
| 2004/0080504 | A1 | 4/2004 | Salesky et al. | |
| 2004/0131357 | A1* | 7/2004 | Farmer et al. | 398/67 |
| 2004/0138858 | A1* | 7/2004 | Carley | 702/186 |
| 2004/0255232 | A1* | 12/2004 | Hammond et al. | 715/500 |
| 2006/0271624 | A1* | 11/2006 | Lyle et al. | 709/204 |
| 2008/0086751 | A1* | 4/2008 | Horn et al. | 725/87 |
| 2008/0158339 | A1* | 7/2008 | Civanlar et al. | 348/14.09 |

OTHER PUBLICATIONS

EPO International Search Report for application No. PCT/EP2010/056207 (AUS080521) dated Dec. 17, 2010.
Adobe, "Adobe Acrobat Connect Handbuch", Dec. 31, 2006, Retrieved Dec. 1, 2010, 36 pages. http://help.adobe.com/de_DE/Connect/6.0/AcrobatConnect/acrobat_connect_help.pdf.
Rousseau et al., "Streaming Support in an Advanced Multimedia Infrastructure for the WWW", Computers and Communications, 1999, Proceedings. IEEE International Symposium on Red Sea, Egypt, Jul. 6-8, 1999. pp. 173-179.

* cited by examiner

*Primary Examiner* — Hua Fan
*Assistant Examiner* — Mohammed Ahmed
(74) *Attorney, Agent, or Firm* — Yee & Associates, P.C.; David A. Mims, Jr.

(57) ABSTRACT

Web conference performance monitoring systems enable presenters to monitor their audience's content receiving experience and modify their content's transmission characteristics to resolve technical difficulties. A system for monitoring a Web conference's performance includes a local processor; memory operably connected to the local processor; a monitor operably connected to the local processor; content loaded into memory and operable by the local processor; and an audience screen preview program loaded into the memory and operable by the local processor, wherein the audience screen preview program instructs the local processor to measure network throughput of a network connection between the local processor and a remote processor and display at least a portion of the content on the monitor operably connected to the local processor by simulating the content being transmitted to the monitor operably connected to the local processor over the network connection.

24 Claims, 4 Drawing Sheets

FIG. 4

WEB CONFERENCE PERFORMANCE MONITORING SYSTEM

BACKGROUND

The present invention relates to a Web conference performance monitoring system. Web conferences are an increasingly popular method for disseminating information to a geographically dispersed audience. However, because participants can use a diverse array of computer hardware, system settings, and network connections to connect to Web conferences, participants may experience technical difficulties receiving content having particular transmission characteristics. Existing Web conference systems do not permit a presenter from being aware if he or she is presenting at a different screen resolution than that of the audience. Furthermore, existing Web conference systems do not make the presenter aware of other technical problems experienced by audience members, such as slow image loading because of bandwidth constraints. A presenter often only becomes aware of technical difficulties when audience members disrupt a Web conference to complain about slow image loading or images being too large or too small. Technical difficulties and associated disruptions seriously detract from the effectiveness of the presentation.

SUMMARY

One embodiment of the present invention is a method of monitoring a Web conference's performance. There may be a step of displaying the network throughput of the network connection between the local processor and the remote processor on the monitor operably connected to the local processor. There may also be a step of displaying the resolution value of the monitor operably connected to the remote processor on the monitor operably connected to the local processor.

According to one embodiment of the present invention, a system for monitoring a Web conference's performance includes a local processor; memory operably connected to the local processor; a monitor operably connected to the local processor; content loaded into the memory and operable by the local processor; and an audience screen preview program loaded into the memory and operable by the local processor, wherein the audience screen preview program instructs the local processor to measure network throughput of a network connection between the local processor and a remote processor and display at least a portion of the content on the monitor operably connected to the local processor by simulating the content being transmitted to the monitor operably connected to the local processor over the network connection.

One embodiment of the present invention is a method for monitoring a multi-user Web conference's performance. An embodiment of the invention may also include highlighting the relative performance attribute when the relative attribute is within a specified range. Highlighting the relative performance attribute may comprise highlighting the relative performance attribute in a first color for good performance, a second color for average performance, and a third color for poor performance. An embodiment of the invention may also include the step of identifying an error condition in response to the relative performance attribute falling below a specified threshold. An embodiment of the invention may also include the step of providing an alternate content to audience members for whom the error condition has been identified. An embodiment of the invention may also include the step of responsive to an error condition being identified, notifying a service provider of the error condition. An embodiment of the invention may also include the step of responsive to the error condition being identified, requesting a service provider provide the alternate content to audience members for whom the error condition has been identified.

DETAILED DESCRIPTION

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable mediums may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium may even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including, but not limited to wireless, wireline, optical fiber cable, RF, etc. The medium may be remote to the user, thus allowing the use of the program over a large area computer network, including a global network such as the Internet.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider), whether via wireless, wireline or other transmission means.

An embodiment of the present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
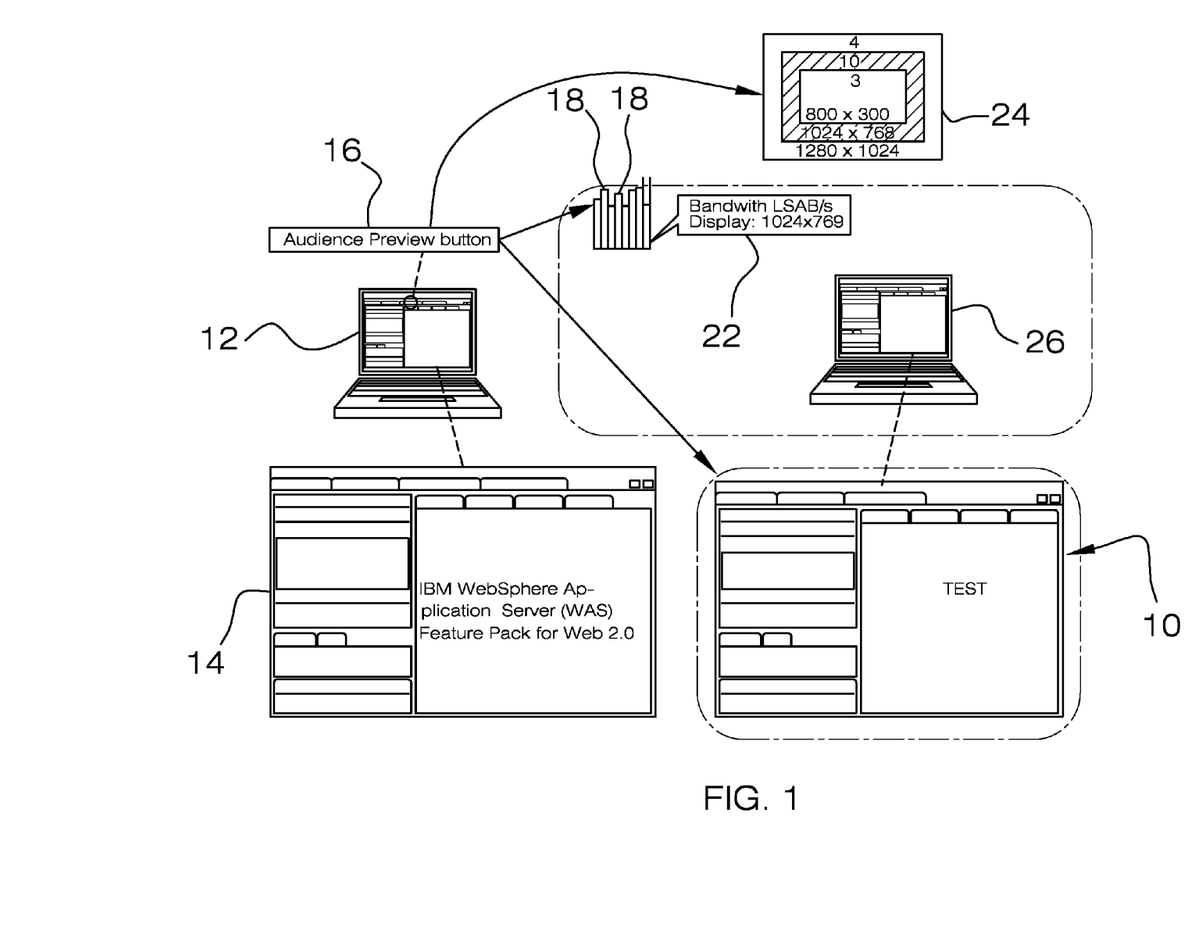
FIG. 1 is a schematic view of an embodiment of the audience preview screen constructed in accordance with the principles of the present invention.

Referring now to FIG. 1, an embodiment of the audience preview screen 10 is illustrated. More particularly, the embodiment of the audience preview screen 10 is displayed when the presenter clicks on the audience preview button 16 included in the presenter screen 14 on a presenter computer 12 to initiate the audience screen preview program 400. The presenter screen 14 is used by the presenter to control the display of content, such as a presentation, on the audience computers 26. The audience preview screen 10 enables the presenter to ascertain how well the audience computer 26 is displaying the presentation. Although only a single audience computer 26 is illustrated, there may be a plurality of audience computers 26 displaying the presentation. The audience preview screen 10 accomplishes this by providing quantitative information regarding the audience computers' 26 network connection bandwidth and screen resolution, as well as showing the presentation as it is displayed on either the most common audience computer 26 configuration (the average network connection bandwidth and screen resolution of the audience computers 26) or, at the presenter's option, the worst audience computer 26 configuration (the configuration of the audience computer 26 having the lowest network connection bandwidth and screen resolution).

The color-coded bandwidth progress bars 18 each reflect the network connection performance of a specific audience computer 26. The color of each progress bar 18 reflects the connection bandwidth of a specific audience computer 26. In the current embodiment, slow connections are displayed in red, average connections are displayed in yellow, and fast connections are displayed in green. Various techniques that may be used to determine connection speeds will be described subsequently. The presenter can configure which ranges of connection speeds are classified as slow, average, and fast. The height of each progress bar 18 reflects the percentage of the contents of the current page of the presentation that has been transferred to that specific audience computer 26. The presenter can obtain quantitative detail regarding the display resolution and bandwidth of a specific audience computer 26 by selecting a particular progress bar 18 to display its detail pop up 22.

By observing the progress bars 18, the presenter can determine if an error condition exists by observing if any audience computers 26 are having difficulty receiving the presentation. The presenter can also ascertain when all of the audience computers 26 are displaying the current page of the presentation. Data can be collected for this purpose by a server-side monitoring agent that captures HTTP/HTTPS transaction data such as webpage response time and status codes. The performance of webpage embedded objects, and video and audio requests, can also be monitored. A variety of data types can be collected by the monitoring agent and reported to the presenter, including:

Client Time—For web applications, this time is actually a subset of the browser time and is calculated as the time difference between Loading a web page's HTML content and the first request for additional embedded content. In some cases, this time is several seconds due to slow running JavaScript determining what embedded content to fetch next. This time is calculated instead of measured directly.

Network Time—Time measured as data flows over the network from the audience computer's web browser to the web server. Each HTML packet that flows, and each web object that flows, is measured independently and rolled up to reflect total network time.

Server Time—Time measured on the server and all back-end application servers and components. Server time is accumulated as a lump sum and no breakout of back-end time is provided.

Load Time—Time it takes between a request for a web page using an HTTP Get or Post protocol and the time it takes to get the resulting HTML returned. This time does not include any screen rendering time nor does it include time taken to fetch embedded web page content. However, it does include DNS lookup time.

Resolve Time—Time between getting the first byte of the returned HTML and the last byte of returned embedded web page object (JPEGs, GIFs, and JavaScript). Resolve and Load time can, and often are overlapping to some extent. This is because of a browser performance feature that fetches imbedded objects even before the HTML is fully loaded. This time is calculated instead of measured directly. Relevant Request Metrics available can include:

Average Request Packet Count—Average number of request packets

Request Packet Count—Number of request packets

Request ACK Packet Count—Number of request ACK packets

Reply Packet Count—Number of response packets

Reply ACK Packet Count—Number of response ACK packets

Total Bytes—Total bytes of in request and response

Request Bytes—Total bytes in request

Reply Bytes—Total bytes in response

Total Object Count—Total number of objects in page

Total Object Size—Total size of objects in page

Total Header Request Count—Total header count of request

If any audience computers 26 are having difficulty receiving the presentation, the presenter may take action to reduce the amount of data that must be transmitted, such as by limiting the amount of scrolling of the presentation. Furthermore, if the presenter determines transmission problems are the result of too many audience members, the presenter can disconnect some audience members; the presenter may determine which audience members are disconnected. The presenter can determine transmission problems are the result of too many audience members by observing statistics from data reported by the monitoring agent illustrating longer average response times on the server side for each client transaction. The presenter can determine which audience members should be disconnected based on how important their attendance is or from data reported by the monitoring agent regarding which clients are consuming the most network bandwidth.

The presenter may also contact a service provider regarding the difficulty and/or arrange for audience members experiencing difficulties to receive alternate forms of the presentation, such as a downloadable audio file instead of streaming audio. The service provider in this case refers to a third-party hosting service serving up the presentation's content. End-to-end traffic is monitored by response time monitoring agents. Slow down on the network side can be identified from breakdown of the network hops for the hosting service provider. Slow down caused by the content provider may be determined by a server side agent. Data gathered by the monitoring agents results in a dialog on the presenter's screen highlighting the unique members whose network connections are performing below a certain threshold. The presenter selects those audience members below that threshold and identifies the service provider supporting those audience members (which may be a plurality of service providers, supporting at least one of the audience members). Each service provider then provides alternate or filtered content from the presenter and notifies the audience member supported by the corresponding service provider that the content has been filtered or switch to an alternative to reduce the perceived problem. Alternatively, the provision of alternate or filtered content may happen automatically without manual intervention by the presenter.

The audience display resolutions graphic 24 shows the presenter the display resolutions currently used by the audience computers 26. The display resolutions in use and the number of audience computers 26 having each display resolution are depicted. The display resolution used by the largest number of audience computers 26 is highlighted. The audience preview screen 10 also shows a copy of the current page of the presentation as it is viewed by the audience members having the most common display resolution. Optionally, the presenter may elect for the displayed copy of the current page of the presentation to simulate the download process experienced by an audience member having an average speed network connection or the audience member having the lowest speed network connection. The average network speed connection is determined by calculating the average of the network connection speeds of the audience computers 26. The presenter can use this information to readily assess if he or she is distributing the presentation at a resolution that is optimal for the largest number of audience computers 26. If the audience's presentation as presented on the presenter's screen indicates the presentation's displayed content is too small to be easily visible by the presenter in the audience preview screen 10, the presenter can reduce the presentation's resolution on the presenter screen 14. If the presentation is too large in the audience preview screen 10, the presenter can increase the presentation's resolution on the presenter screen 14.

Figure 2:
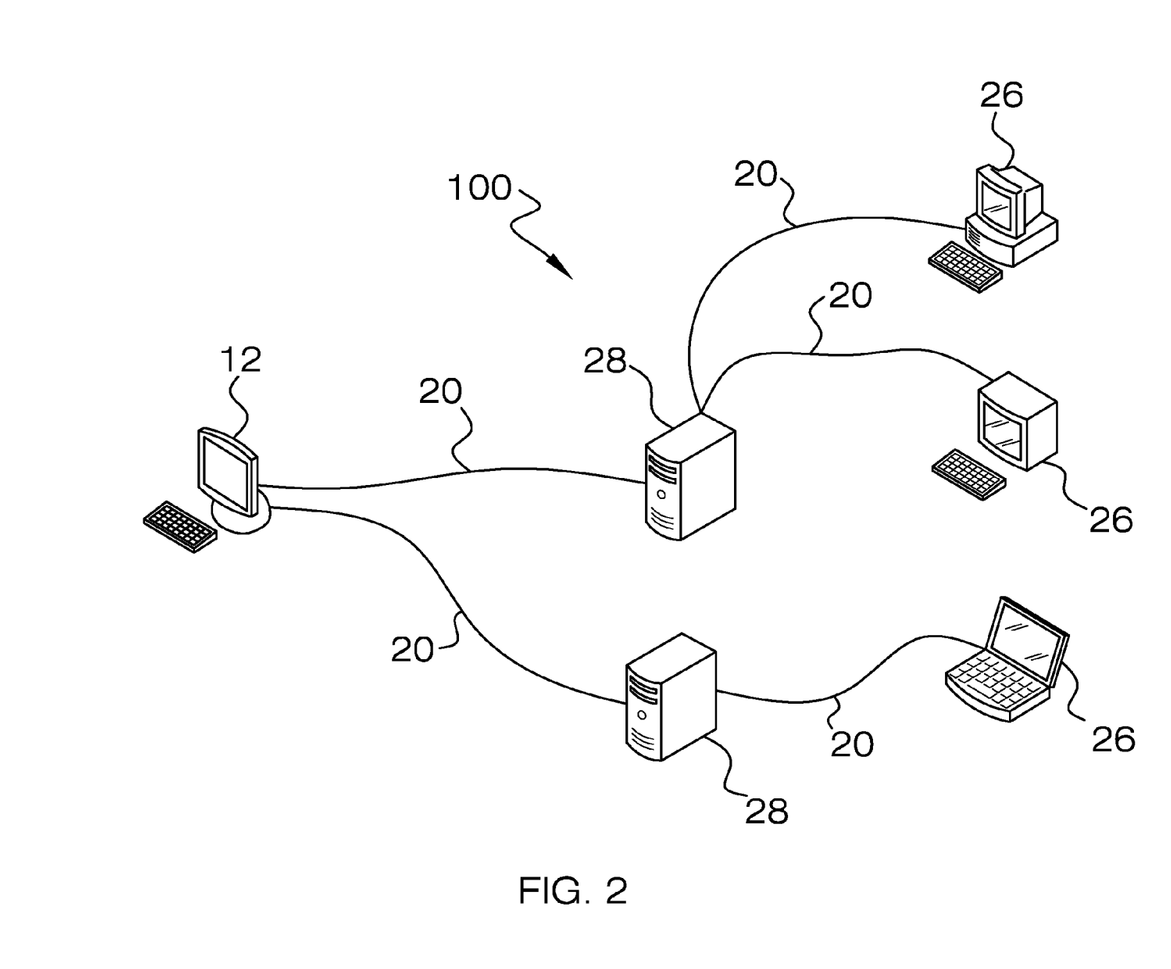
FIG. 2 is a schematic view of an embodiment of a Web conference content delivery system of the present invention.

Referring now to FIG. 2, an embodiment of the Web conference content delivery system 100 is illustrated. More particularly, a presentation cache server 28 is positioned between the audience computers 26 and the presenter computer 12. The presentation is cached on the presentation cache servers 28, which are located in close geographic proximity to the audience computers 26 so that the best possible performance can be obtained via the network connections 20 between the audience computers 26 and the presentation cache servers 28. Furthermore, the presenter computer 12 only has to send a very small amount of data to the presentation cache servers 28 to advance the presentation instead of having to send the entire presentation itself. This makes smooth delivery of the presentation possible even if the network connections 20 between the presenter computer 12 and the presentation cache servers 28 have limited bandwidth. In the current embodiment, the presentation cache servers 28 collect data from the audience computers 26 regarding the bandwidth of their network connections 20, how much of the current presentation page they have received, and what their display resolution is. A number of third-party monitoring tools exist that can capture this information and provide it to the audience preview screen 10 on the presenter computer 12. Alternatively, the presenter computer 12 may itself also collect a portion or all of this data from the audience computers 26. The audience computers 26 may themselves run a program that assists with the data collection process.

Figure 3:
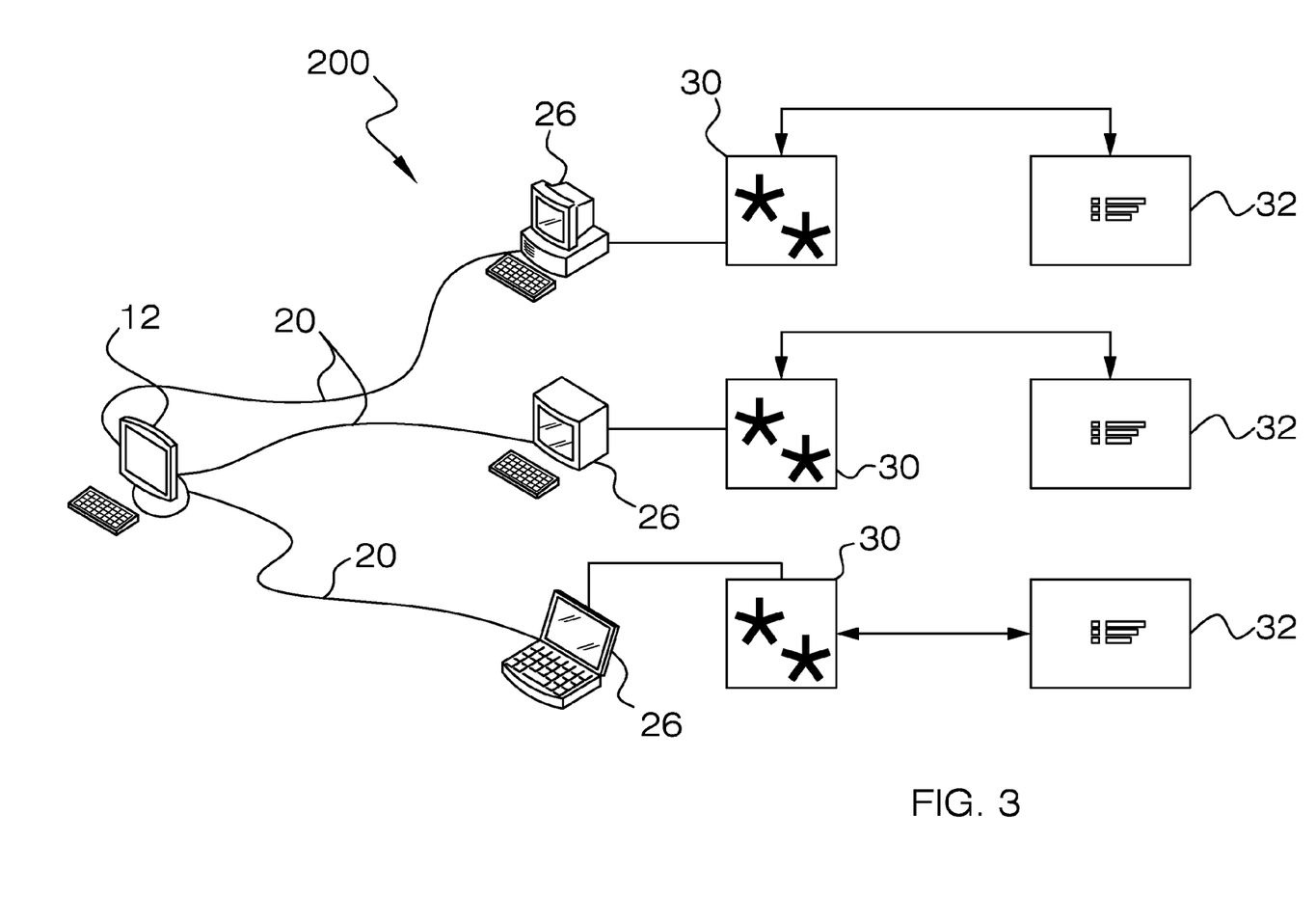
FIG. 3 is a schematic view of an embodiment of a Web conference content delivery system of the present invention.

Referring now to FIG. 3, an embodiment of the Web conference content delivery system 200 is illustrated. More particularly, the Web conference content delivery system 200 is optimized for use when the network connections 20 between the audience computers 26 and the presenter computer 12 are too slow to display the content in real-time. For example, when it is determined that many conference packets (audio, video) are queued up beyond a specified threshold value, or transmission acknowledgment packets show a large lag from when they were transmitted by the presenter (or retransmitted by any node in the transmission stream) to when they were received, then it may be determined that the network connection is slow. In one embodiment, the presentation may be downloaded from the presenter computer 12 to the audience computers 26 by controller plug-ins 30 before the presentation begins. When the presentation occurs, controller plug-ins 30 running on each of the audience computers 26 receive instructions from the presenter computer 12. The controller plug-ins 30 follow the received instructions to control how applications 32 running on each of the audience computers 26 display the previously downloaded presentation. However, the controller plug-in 30 may monitor particular attributes of the presentation, such as the arrival rate of video/audio packets of the presentation, and inform the presenter about the arrival rate in order for the presenter to take corrective action, such as reducing the transmission rate of packets. These instructions are designed to dynamically adjust the bandwidth of each audience computer, and thus may require far less bandwidth than the presentation itself. The instructions may act such that each audience computer 26 displays the presentation smoothly despite slow or varying network connections 20.

The plug-ins 30 can also drive the presentation using real time playback of scripts or actions by the presenter. They can report usage data back to the presenter as well. The plug-ins 30 can drive the presentation, relying on instructions from the presenter computer 12 and simultaneously report usage statistics from the audience computers 26 as they request content updates from the presenter computer 12. The web requests by the plug-ins 30, even though ultimately originated from the presenter computer 12 in the form of a playback script, can be played on the audience computers 26 as if the audience computers 26 had initialed the request.

The architectures of the Web conference content delivery systems 100 and 200 can be blended by using presentation cache servers 28 when it would be advantageous to improve presentation delivery. Furthermore, the controller plug-ins 30 may be instructed to download the presentation in advance when the network connection 20 is found to be slow, but to otherwise download the presentation in real time when the network connection 20 is adequate for good performance. Performance predictions can be made in advance of the presentation by identifying the number of participants who have indicated they will be attending the presentation and their relative locations, based on their IP addresses, so that use of presentation cache servers 28 can be obtained and/or the controller plug-ins 30 can be instructed to download the presentation in advance. Furthermore, each audience member may be asked to identify their network speed when they register, or the speed may be determined dynamically during the registration process for the presentation in order to determine whether presentation cache servers 28 need to be made available and/or an audience member should download the presentation in advance. Determination of an audience member's network speed may occur on an automated or manual basis at the time of registration. This may occur by measuring the time required to download a file of known size to the audience member's computer 26 at the time of registration.

Figure 4:
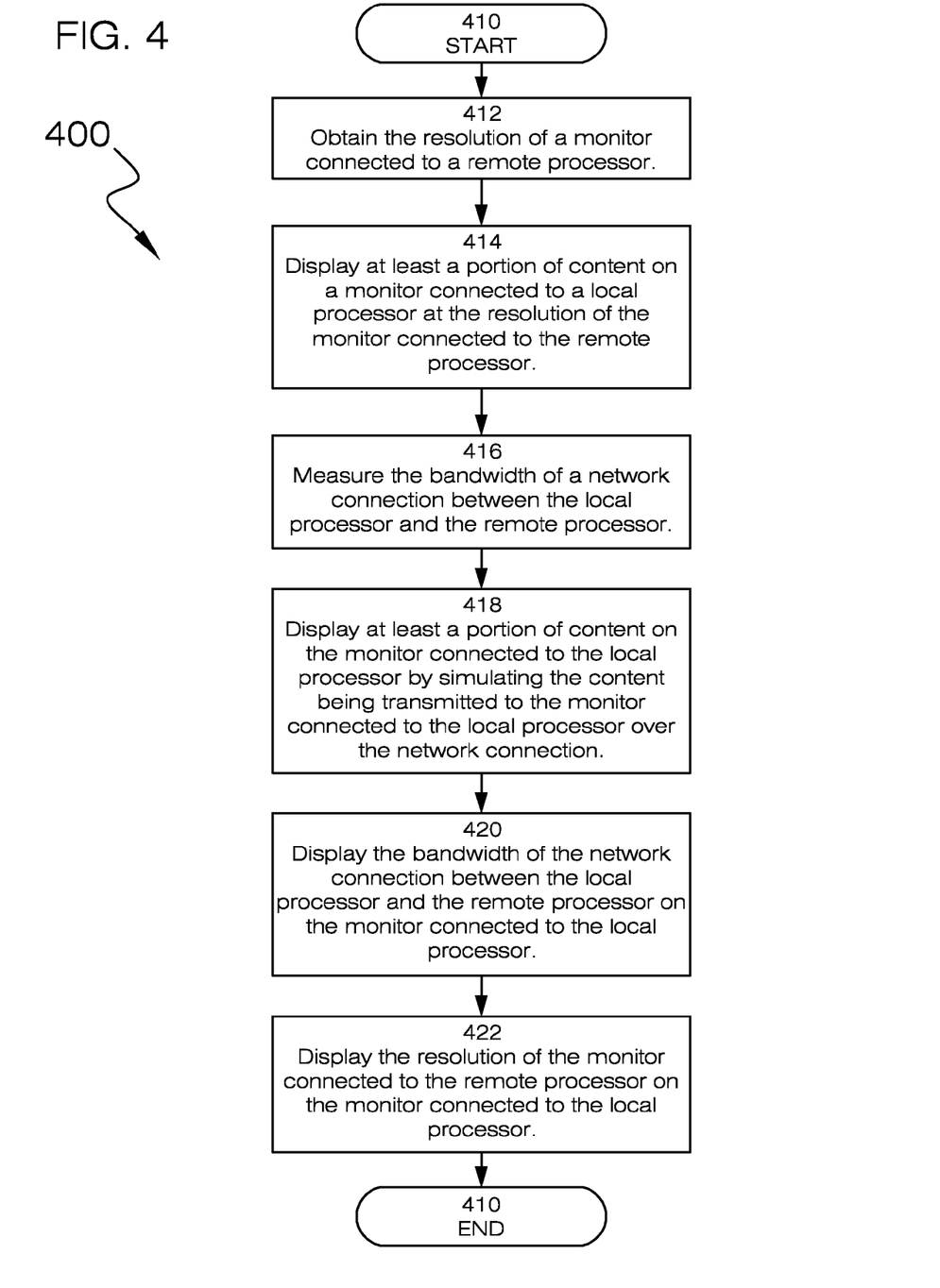
FIG. 4 is a flow chart of an embodiment of an audience screen preview program of the present invention.

Referring now to FIG. 4, an embodiment of the audience screen preview of presenters screen 12 program 400 is illustrated. The audience screen preview flowchart begins (410) by obtaining the resolution of a monitor connected to a remote processor (412). Subsequently, the audience screen preview program 400 causes a local processor to display at least a portion of content on a monitor operably connected to the local processor at the resolution of the monitor operably connected to the remote processor (414). The audience screen preview program also measures the bandwidth of a network connection between the local processor and the remote processor (416). Then, the audience screen preview program displays at least a portion of the content on the monitor operably connected to the local processor by simulating transmission of the content to the monitor operably connected to the local processor over the network connection (418). The audience screen preview program also displays the bandwidth of the network connection between the local processor and the remote processor on the monitor operably connected to the local processor (420) and displays the resolution of the monitor operably connected to the remote processor on the monitor operably connected to the local processor (422) prior to terminating (424).

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for monitoring a Web conference's performance comprising:
    providing a local processor, memory operably connected to the local processor, a monitor operably connected to the local processor, and content loaded into the memory;
    obtaining a resolution of a monitor operably connected to a remote processor;
    determining network throughput of a network connection between the local processor and the remote processor;
    selecting a representative audience computer configuration using the resolution of the monitor operably connected to the remote processor and the network throughput of a respective network connection between the local processor and the remote processor for the selected representative audience computer configuration;
    displaying at least a portion of the content on the monitor operably connected to the local processor with indicators corresponding to the resolution of the monitor connected to the remote processor and the determined network throughput of the selected representative audience computer configuration;

displaying to a presenter information including load time, resolve time and average request packet count;

in response to receiving instructions from the local processor at one or more of the remote processors, the one or more of the remote processors performing an action including dynamically adjusting the bandwidth of each audience computer using the bandwidth of a network connection between the local processor and the one or more of the remote processors, driving presentation at each audience computer using real time playback of scripts and actions of the presenter, downloading the content in advance to each audience computer, and dynamically determining a network speed of each audience computer; and displaying the content to a plurality of monitors of an audience through a presentation cache server positioned between an audience computer and a presentation computer.

2. The method of claim 1, further comprising displaying a bandwidth of the network connection between the local processor and the remote processor on the monitor operably connected to the local processor.

3. The method of claim 1, further comprising the step of displaying a resolution value of the monitor operably connected to the remote processor on the monitor operably connected to the local processor.

4. A system for monitoring a Web conference's performance comprising:

a local processor;

memory operably connected to the local processor comprising a presentation cache server positioned between an audience computer and a presentation computer;

a monitor operably connected to the local processor;

content loaded into the memory and operable by the local processor; and an audience screen preview program loaded into the memory and operable by the local processor, wherein the audience screen preview program instructs the local processor to measure network throughput of a network connection between the local processor and a remote processor and display at least a portion of the content on the monitor operably connected to the local processor by simulating the content being transmitted to the monitor operably connected to the local processor over the network connection to represent an audience computer configuration using a resolution of a monitor operably connected to the remote processor and the network throughput of a respective network connection between the local processor and the remote processor for the selected representative audience computer configuration;

the audience screen preview program also instructs the processor to display to a presenter information including load time and resolve time, resolve time and average request packet count; and in response to receiving instructions from the local processor at one or more of the remote processors, the one or more of the remote processors performing an action including dynamically adjusting the bandwidth of each audience computer using the bandwidth of a network connection between the local processor and the one or more of the remote processors, driving presentation at each audience computer using real time playback of scripts and actions of the presenter, downloading the content in advance to each audience computer, and dynamically determining a network speed of each audience computer.

5. The system of claim 4, wherein the audience screen preview program instructs the local processor to obtain a resolution value of the monitor operably connected to the remote processor and display at least a portion of the content on the monitor operably connected to the local processor at the resolution value of the monitor operably connected to the remote processor.

6. The system of claim 5, wherein the audience screen preview program instructs the local processor to display the network throughput of the network connection between the local processor and the remote processor on the monitor operably connected to the local processor.

7. The system of claim 5, wherein the audience screen preview program instructs the local processor to display the resolution value of the monitor operably connected to the remote processor on the monitor operably connected to the local processor.

8. A method for monitoring a multi-user Web conference's performance comprising:

identifying each audience member in the Web conference;

displaying a content of the Web conference to each audience member through a presentation cache server positioned between an audience computer and a presentation computer;

identifying a specific performance attribute of the Web conference for each audience member in the Web conference;

determining an average performance attribute using the identified specific performance attribute;

determining a relative performance attribute of each audience member in the Web conference, wherein the relative performance attribute is based on the average performance attribute and the specific performance attribute;

presenting the relative performance attribute of each audience member in the Web conference to a presenter of the Web conference; and displaying on the presentation computer information including average request packet count, client time, network time, server time and a portion of the content on a monitor operably connected to the presentation computer for a selected representative audience computer configuration using a resolution of a monitor operably connected to the audience computer and network throughput of a respective network connection between the presentation computer and the audience computer for the selected representative audience computer configuration; and in response to receiving instructions from the local processor at one or more of the remote processors, the one or more of the remote processors performing an action including dynamically adjusting the bandwidth of each audience computer using the bandwidth of a network connection between the local processor and the one or more of the remote processors, driving presentation at each audience computer using real time playback of scripts and actions of the presenter, downloading the content in advance to each audience computer, and dynamically determining a network speed of each audience computer.

9. The method of claim 8, wherein presenting the relative performance attribute comprises highlighting the relative performance attribute when the relative attribute is within a specified range.

10. The method of claim 9, wherein highlighting the relative performance attribute comprises highlighting the relative performance attribute in a first color for good performance, a second color for average performance, and a third color for poor performance.

11. The method of claim 8, further comprising the step of identifying an error condition in response to the relative performance attribute falling below a specified threshold.

12. The method of claim 11, further comprising the step of providing an alternate content to audience members for whom the error condition has been identified.

13. The method of claim 11, further comprising the step of responsive to the error condition being identified, notifying a service provider of the error condition.

14. The method of claim 13, further comprising the step of responsive to the error condition being identified, requesting a service provider provide an alternate content to audience members for whom the error condition has been identified.

15. The method of claim 11, wherein an error condition is at least one of the group comprising a specified threshold value of Web conference packets being queued up beyond a specified threshold value and transmission acknowledgment packets showing a lag beyond a specified threshold value from when they were transmitted to an audience member to when they were received by an audience member.

16. The method of claim 12, wherein the alternate content is selected from the group comprising streaming Web conference content at a lower resolution and a downloadable file of Web conference content.

17. The method of claim 13, further comprising the step of the service provider providing additional network bandwidth for the audience members experiencing an error condition.

18. The method of claim 14, wherein the alternate content is selected based on the degree to which the relative performance attribute has fallen below a specified threshold.

19. The method of claim 14, wherein the service provider selects the alternate content to be provided.

20. The method of claim 14, wherein the request that a service provider provide the alternate content specifies the alternate content to be provided.

21. The method of claim 1 further comprising displaying to the presenter information including client time, network time, and server time.

22. The method of claim 21 further comprising displaying to the presenter information including request packet count and request ACK packet count.

23. The method of claim 22 further comprising displaying to the presenter information including reply packet count, and reply ACK packet count.

24. The method of claim 23 further comprising displaying to the presenter information including object count, object size, and header request count.

* * * * *